United States Patent [19]

Takahashi et al.

[11] Patent Number: 4,833,044
[45] Date of Patent: May 23, 1989

[54] FILM TYPE MAGNETIC RECORDING MEDIUM

[75] Inventors: Minoru Takahashi; Terunobu Miyazaki; Susumu Shinagawa; Yuudou Abe; Yoshinobu Saitou, all of Sendai, Japan

[73] Assignees: Tohoku Steel Co., Ltd., Miyagi; Canon Kabushiki Kaisha, Tokyo, both of Japan

[21] Appl. No.: 614,872

[22] Filed: May 29, 1984

[51] Int. Cl.[4] .............................. G11B 5/66
[52] U.S. Cl. .................... 428/694; 427/131; 427/128; 427/132; 428/695; 428/900; 428/611; 428/412; 428/480
[58] Field of Search ............ 428/694, 695, 693, 900, 428/412, 480, 611, 928, 523; 427/132, 128, 131; 204/192 M; 36/134-136

[56] References Cited

U.S. PATENT DOCUMENTS

| | | | |
|---|---|---|---|
| 3,206,325 | 9/1965 | Averbach | 428/694 |
| 4,087,582 | 5/1978 | Shirahata | 428/457 |
| 4,407,901 | 10/1983 | Miyatsuka | 428/694 |
| 4,439,486 | 3/1984 | Yamada | 428/694 |

OTHER PUBLICATIONS

National Technical Report, vol. 28, No. 3, Jun. 1982, pp. 122-128.

Primary Examiner—Paul J. Thibodeau
Attorney, Agent, or Firm—Michael N. Meller

[57] ABSTRACT

A film type magnetic recording medium comprising as a magnetic recording layer an iron-cobalt-nickel-chromium magnetic alloy containing 10-51 wt. % cobalt, 1-30 wt. % nickel, 1-10 wt. % of chromium and 6 wt. % or less of at least one of the elements molybdenum, tungsten, vanadium, niobium, tantalum, copper, titanium and zirconium, high in durability and magnetic property, and moreover, capable of easily forming a magnetic alloy film thereon by vacuum deposition.

8 Claims, 2 Drawing Sheets

FILM TYPE MAGNETIC RECORDING MEDIUM

FIELD OF THE INVENTION

This invention relates to a metallic film type magnetic recording medium for use in magnetic sound recording, magnetic image transcription and the like, and more particularly to a magnetic alloy suitable for a film type magnetic recording medium.

BACKGROUND OF THE INVENTION

In general, the tape used at present as a magnetic recording medium is mostly a so-called metal tape in which ferromagnetic metal powder is coated on a polyester base film. However, this tape, which employs a binder, is limited with request forming a film of a magnetic layer, capable of obtaining a high recording density. Recently, there has been highlighted a metallized tape having a metallic film formed by a so-called gaseous phase plating method typified by vacuum deposition not needing any binder.

As the metallized tape of the type described above, there has been proposed a metallized tape having as the recording magnetic material a film of a cobalt-nickel magnetic alloy containing from 20 to 30 wt%Ni.

As regards the high recording density, this magnetic recording medium has an outstanding performance, but on the contrary, it has the disadvantages that the Co-Ni magnetic alloy magnetic layer is very expensive, the medium itself is brittle and tends to initiate cracks, and it is easily corroded under high temperature and high humidity, whereby the magnetic property is deteriorated, i.e. it is unfavorable in so-called corrosion resistance and the like, so that the medium has limited durability.

To improve the corrosion resistance from among the above-described problems, there have been studied protective layers obtained by coating the magnetic layer with a metal having high corrosion resistance and by applying a rustproof high polymeric substance into the magnetic layer. However, these treatments still prove unsatisfactory in their effects. The reason is that, since a Co-Ni magnetic alloy is very brittle, in producing the magnetic recording medium and during use, very small cracks are initiated, whereby even the protective layer is broken off and thus fails in providing protection against corrosion. The aforesaid cracking generates noises and considerably lowers the durability of the medium in cooperation with the unsatisfactory corrosion resistance. Consequently, in order to obtain a metallic film type magnetic recording medium satisfactory durability, it is necessary to form a magnetic layer having a satisfactory corrosion resistance in the magnetic recording layer and having a high toughness.

However, there has heretofore been known no metallic film type magnetic recording medium having as a magnetic recording layer a ferromagnetic layer with the magnetic property needed for acquiring a high recording density, as well as a corrosion resistance necessary from the viewpoint of durability, and acceptable mechanical properties.

SUMMARY OF THE INVENTION

This invention has as its object the provision of an inexpensive metallic film type magnetic recording medium capable of obtaining a high recording density and having high durability.

Now, improvements in the corrosion resistance of a Co-Ni alloy are achieved by the addition of chromium. On the other hand, the addition of chromium considerably lowers the magnetic flux density and hardly contributes to improvements in brittleness. Consequently, the addition of chromium to the Co-Ni alloy should not necessarily be effective.

As the result of various studies, the inventors of the present invention have found that an iron-cobalt-nickel-chromium alloy with an outstanding adaptability to a magnetic alloy for a metallic film type magnetic recording medium is one which contains from 10 to 51 wt%Co, preferably from 12 to 51 wt%Co, from 1 to 30 wt%Ni, preferably from 1 to 20 wt%Ni, 10 wt%Cr, the balance being Fe. Here, the inventors of the present invention have found that an alloy containing from 10 to 51 wt%Co, from 1 to 30 wt%Ni, the balance being Fe has a saturated magnetic flux density as high as 1.7–2.4 KG, has high toughness, maintains a value for the saturated magnetic flux density of 1.5 KG or more and still has an undeteriorated toughness even if 10 wt% or less of chromium is contained within the above composition range in order to improve the corrosion resistance, thus enabling to achieve the present invention.

More specifically, the gist of the present invention resides in the provision of a metallic film type magnetic recording medium including: one being high in corrosion resistance, having as a magnetic recording layer an Fe-Co-Ni-Cr alloy of high durability; and another having high corrosion resistance and comprising a magnetic recording layer of an Fe-Co-Ni-Cr alloy containing 51 wt%Co or less, 20 wt%Ni or less within the hatched area in FIG. 1, from 3 to 9 wt%Cr, or with part of the above Cr content being substituted by 6 wt%Mo and or V or less, the balance being essentially Fe and inevitable impurities.

DETAILED DESCRIPTION OF THE INVENTION

In the magnetic alloy used in the magnetic recording layer of the film tape magnetic recording medium according to the present invention, if the content of Co exceeds 51 wt%, then it is disadvantageous in that the manufacturing cost is increased and the magnetic alloy becomes brittle in particular. But then, if the content of Co is less than 10 wt%, then a magnetic flux density is lowered, whereby the addable content of chromium is restricted, thus presenting the disadvantage in corrosion resistance. Ni is effective in improvements of toughness of an Fe-Co alloy, but, it is adequate to restrict the content of Ni to 30 wt% or less because it lowers the magnetic flux density.

It is preferable from the viewpoint of the magnetic property that the magnetic alloy according to the present invention contain Co and Ni within the ranges from 12 to 51 wt%Co and from 1 to 20 wt%Ni in particular in its composition. Furthermore, it has been found that the contents of Co and Ni depend on each other, and there exists the following relationship therebetween.

Co wt% = 50 − 2.5 × (the weight percentage of nickel) ~ 53 − 1.5 × (the weight percentage of nickel)

This relationship will be shown in the hatched area in FIG. 1 to be described hereunder.

When chromium is added to improve the corrosion resistance, the magnetic flux density is lowered in accordance with the increase of the content of chromium. Consequently, it is desirable that the content of chromium to be added to 10 wt% or less, and, in order to improve the corrosion resistance, it is necessary to add at least 1 wt%Cr, preferably from 3 to 9 wt%Cr. The reason why the addable content of chromium is restricted to 10 wt% or less is that even the Fe-Co-Ni alloy containing no chromium has sufficient toughness, whereby no cracks are initiated on the magnetic recording layer formed on a base, and durability is obtained by the applying rustproof treatment thereto. However, it is preferable to add chromium to make the magnetic layer more corrosion-resistant because the durability is improved. In this case, it is sufficient to use a content of 10 wt%Cr or less. If the content of chromium exceeds 10 wt%, then the magnetic flux density and the coercive force are considerably lowered.

Addable to the above basic composition of the magnetic alloy in addition to the aforesaid Ni, Cr and Fe when necessary are 6 wt% or less of molybdenum, tungsten, vanadium, niobium, tantalum, titanium, copper and zirconium, 3 wt% or less of calcium, magnesium, aluminum, silicon and manganese, and further, 0.1 wt% or less of gold, silver or one of the platinum group elements, or one of the rare earth elements such as lanthanum or cerium. Out of the above-mentioned addable metal elements, molybdenum and vanadium can be added such that part of the chromium in the amount of from 3 to 9 wt% is substituted by molybdenum or vanadium of 6 wt% or less. The balance other than these addable metals is essentially iron and inevitable impurities.

In the magnetic alloy according to the present invention, the content of cobalt can be reduced by the addition of nickel, whereby it becomes advantageous in the reduction of the manufacturing cost. On the other hand, the content of chromium required for obtaining a satisfactory magnetic property is decreased with the increase of nickel, and it is preferable to restrict the content of nickel to 20 wt% or less from the viewpoint of maintaining a satisfactory magnetic property as well as obtaining a good corrosion resistance.

Since cobalt is an expensive element, the upper limit to the content of cobalt is set at 51 wt%, and further, it is desirable to substitute the content of cobalt by the content of nickel as much as possible in accordance with the aforesaid relationship equation. However, if the content of cobalt is reduced by 12 wt% or more, then the coercive force is lowered, and further, the addable content of chromium becomes very small, whereby, the corrosion resistance is lowered.

The content of nickel is determined in relation to the content of cobalt. However, when the content of nickel is smaller than the content of nickel calculated in the aforesaid equation, the coercive force becomes low. On the contrary, if the content of nickel is excessively larger than the calculated content, the saturated magnetic flux density is reduced abruptly.

Also, the content of chromium is determined in relation to the content of nickel, and the upper and lower limits to the content of chromium substantially correspond to those of nickel, respectively.

When the content of chromium is larger than 9 wt%, the saturated magnetic flux density is lowered, and, when it is smaller than 3 wt%, no satisfactory corrosion resistance is obtainable.

As for the content of chromium, part of it can be substituted by molybdenum and/or vanadium. When molybdenum and/or vanadium of 6 wt% or less are used in substitution, the composition of chromium and molybdenum and/or vanadium proves effective in reinforcement of the coercive force in the same manner as in the case of chromium only. However, the above-described substitution presents disadvantages in cost and corrosion resistance to a certain extent.

As the balance, it is permissible to include Fe and inevitable impurities including aluminum, manganese, silicon, calcium and magnesium, which are used as deoxidizer for the alloy refining, and phosphorus and sulfur. On the other hand, to improve the corrosion resistance, a small content of gold, silver or one of platinum group elements may be added.

In the case of producing the recording medium according to the present invention, normally, an alloy adjusted to the composition intended for fusing production is used as a material for deposition. However, a magnetic layer having an desired composition can be formed in the form of a film on a tape, while respective elements are fed from separate evaporation sources with the deposition speeds of the respective elements being adjusted.

In general, when the magnetic alloy layer of the type described is formed by deposition in the oblique direction, the rate of columnar crystals in the formed magnetic alloy layer is decreased with an increase in the angle of incidence, whereby the magnetic flux density is lowered. For example, a magnetic alloy layer of Co—25 wt%Ni is deposition-formed at an angle of incidence of 75° under a degree of vacuum from $6 \times 10^{-6}$ to $8 \times 10^{-6}$ Torr for example, the magnetic flux density is about 4.0 KG. When the magnetic alloy according to the present invention such as for example, a magnetic alloy containing 12.3 wt%Ni, 6 wt%Cr, 1 wt%Mo, 0.2 wt%V, the balance being Fe is formed into a magnetic alloy layer under the same conditions as described above, the magnetic flux density is 7.0 KG, and it is advantageous in that the deposition is facilitated and a magnetic alloy layer having a high magnetic flux density is obtainable.

When forming the alloy composition according to the present invention as a magnetic film of a metallized tape, in order to avoid the non-uniformity in content tape due to the high evaporation pressure of chromium in particular among the respective constituent elements, an Fe-Co-Ni alloy having elements of substantially uniform evaporation pressure should be first formed, an evaporation source for chromium should be formed separately, and the elements should be simultaneously deposited while the evaporation speeds are controlled so that each desired composition may be attained. In addition, the deposition may be carried out while a strip or a plate of an Fe-Co-Ni-Cr alloy having a desired composition is continuously fed to the evaporation sources.

The Fe-Co-Ni-Cr alloy magnetic layer according to the present invention is not so brittle as the conventional Co-Ni magnetic alloy and has a toughness, whereby very small cracks are not initiated during the manufacture of the magnetic recording medium. Furthermore, the magnetic layer has satisfactory corrosion resistance, so that a magnetic recording medium having high durability can be obtained.

Further, the magnetic recording medium according to the present invention, having a high magnetic flux density in its magnetic layer, can obtain a sensibility higher than that of the conventional magnetic recording medium having a magnetic layer of the Co-Ni alloy.

The magnetic alloy according to the present invention has a large saturated magnetic flux density as compared with the conventional magnetic alloy. It is particularly advantageous that the magnetic recording layer formed on the base according to the present invention has a large saturated magnetic flux density which can solve the problem of unsatisfactory sensibility in the low-frequency area.

The magnetic recording medium according to the present invention is produced by forming a film of the Fe-Co-Ni-Cr alloy on a film of plastic such as polyethylene terephthalate, polycarbonate and polypropylene as a magnetic recording layer under a degree of vacuum from $10^{-4}$ to $10^{-6}$ Torr by the vapor-deposition in oblique direction.

In this case, a metal such as Al, Ti, Mo or Si may be previously deposited on the plastic film as a primary-coating layer. Additionally, to improve the running performance of the tape, the magnetic layer may be coated thereon with an organic substance.

BRIEF DESCRIPTION OF THE DRAWINGS

In FIG. 1, the hatched portion shows the ranges of composition of cobalt and nickel as being the magnetic alloys used in the film type magnetic recording medium according to the present invention. This hatched portion is an area where both the coercive force and the magnetic flux density are high, and, at any position even slightly apart from this area, both the coercive force and the magnetic flux density are lowered.

DETAILED DESCRIPTION OF THE PREFERRED EMBODIMENTS

EXAMPLE 1

Figure 2:
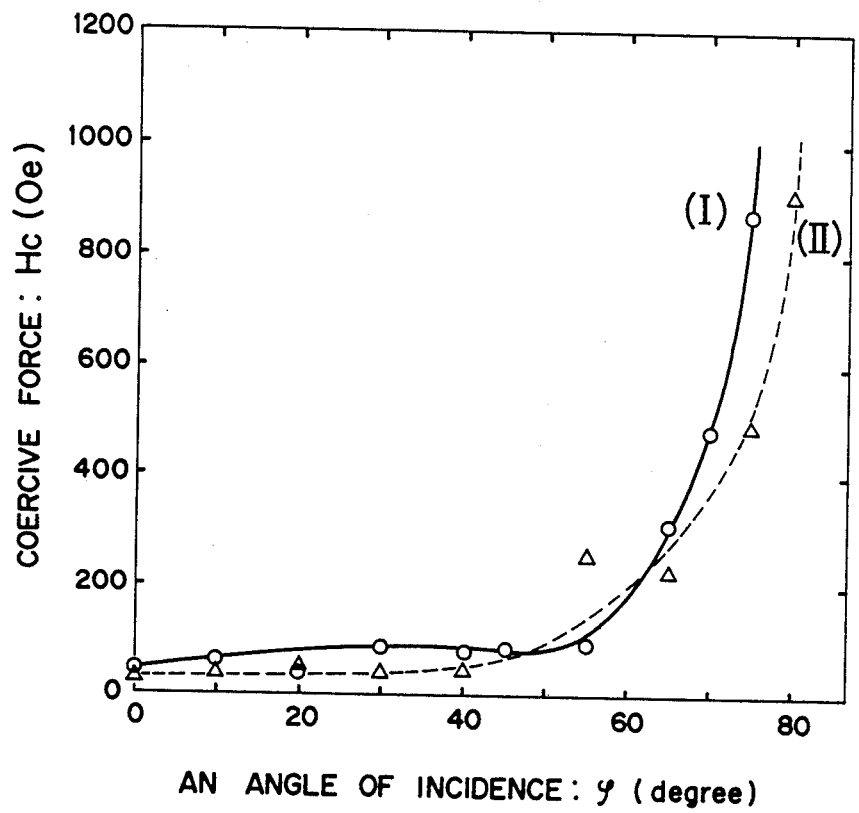
FIG. 2 shows the relationship between the angle of incidence of deposition and the coercive force for the magnetic alloy used in the film type magnetic recording medium according to the present invention and the conventional Co-Ni alloy.

In comparison between the magnetic alloy used in the present invention and the conventional Co-Ni alloy, the influence of the angle of incidence upon the coercive force during the vacuum deposition were compared with each other. FIG. 2 shows the results. In the drawing, curve I shows the results for the magnetic alloy according to the present invention, and curve II shows the results for the conventional Co-Ni alloy.

In this experiment, the Fe-Co-Ni-Cr magnetic alloy according to the present invention contained 24 wt%Co, 12.3 wt%Ni, 6 wt%Cr. 1 wt%Mo, 0.2 wt%V, the balance essentially having Fe. Residual values of Si and Mn used as the deoxidizing agents were 0.31 wt% and 0.14 wt%, respectively, and the value of C was 0.015 wt%. On the other hand, the alloy compared was a Co-Ni alloy containing 25 wt%Ni. Both alloys were subjected to vapor-deposition under a vacuum of $6 \times 10^{-6}$ Torr and at varied angles of incidence.

As apparent from FIG. 2, the magnetic properties of the deposited films of both alloys showed high coercive forces at an angle of incidence 70° or more. In the case of the magnetic alloy according to the present invention, it is advantageous that a higher coercive force is obtainable at an angle of incidence smaller than that of the other alloy.

Furthermore, with the Co-Ni alloy, the saturated magnetic flux density of the deposited film was 1.3 KG at an angle of incidence 80°, whereas, with the magnetic alloy according to the present invention, the saturated magnetic flux density was 5.3 KG, which was over about four times that of the other alloy, and the rectangular ratio was 0.9, thus making it possible to obtain very satisfactory results.

Furthermore, the alloy according to the present invention and the conventional Co-Ni alloy were compared with each other in corrosion resistance, with both alloys being left to stand at a temperature of 60° C. and humidity of 90 wt% for seven days.

On the surface of the test sample of the Co-Ni alloy, the grain boundaries were considerably corroded, whereas, on the surface of the test sample of the magnetic alloy according to the present invention, there was no change at all.

EXAMPLE 2

Figure 1:
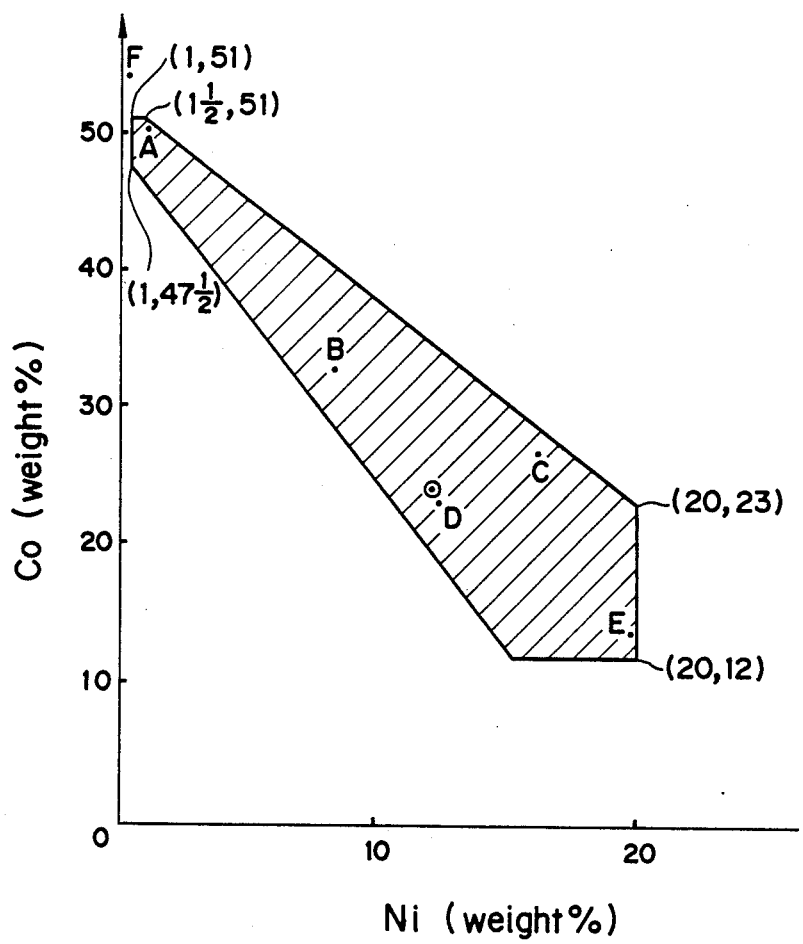
FIG. 1 shows the ranges of composition of cobalt and nickel for the magnetic alloy used in the film type magnetic recording medium according to the present invention.

Subsequently, in Table 1, apart from the one shown in the above embodiment, there are illustrated several embodiments A-E of the magnetic alloys according to the present invention together with an comparative example F. All of the coercive forces shown in Table 1 are ones obtained when the depositions were carried out at an angle of incidence of 75°. In this respect, in FIG. 1, it is shown that the above embodiment circled and the embodiments A-E are all present within the hatched area, whereas, the comparative example F is not present within the hatched area.

TABLE 1

| No. of Embodiment | Compositions | Hc(Oe) |
|---|---|---|
| A | 50.1Co—1.6Ni—3.1Cr—6V—Fe | 600 |
| B | 33.4Co—8.8Ni—2.1Cr—0.16V—Fe | 500 |
| C | 26.3Co—16.2Ni—4.7Cr—0.14V—Fe | 500 |
| D | 23.6Co—12.5Ni—5.9Cr—Fe | 550 |
| E | 12.9Co—19.8Ni—3.7Cr—0.15V—Fe | 550 |
| F | 54.3Co—0.4Ni—8.2Cr—Fe | 300 |

(All of the values of the compositions are to be read as wt %, while Fe is a residual value)

As apparent from Table 1, even when the compositions of two alloys are different from each other, if both alloys are within the range where the relationship in the aforesaid equation is established between the contents of Co and Ni, then a high coercive force (Hc) is obtained. However, in the case of the comparative example being out of the aforesaid range, only a low coercive force is obtained.

EXAMPLE 3

With embodiments G-M which are different in composition from those shown in Table 1 according to the present invention, each of the alloy films is vapor-deposited on a plastic film under a vacuum of $6 \sim 8 \times 10^{-6}$ Torr and at an angle of incidence of 80°. Table 2 shows the results of measurements on the coercive force of the alloy for each of the embodiments.

TABLE 2

| No. of Embodiment | Compositions | Hc(Oe) |
|---|---|---|
| G | 23.5Co—13.2Ni—2.7Cr—2.0Cu—Fe | 740 |
| H | 23.8Co—13.2Ni—2.8Cr—2.0Ti—Fe | 915 |
| I | 23.8Co—13.1Ni—2.7Cr—1.8Zr—Fe | 900 |

TABLE 2-continued

| No. of Embodiment | Compositions | Hc(Oe) |
|---|---|---|
| J | 23.7Co—13.2Ni—2.9Cr—2.0Mo—Fe | 860 |
| K | 23.5Co—13.2Ni—2.7Cr—2.0V—Fe | 895 |
| L | 23.4Co—13.2Ni—2.8Cr—1.9Nb—Fe | 845 |
| M | 23.6Co—13.2Ni—2.7Cr—1.9W—Fe | 845 |

As apparent from Table 2, even when the compositions of two alloys are different from each other, if the both alloys are within range where the relationship in the aforesaid equation is established between the contents of Co and Ni, then a high coercive force is obtained in any embodiment.

EXAMPLE 4

Figure 3:
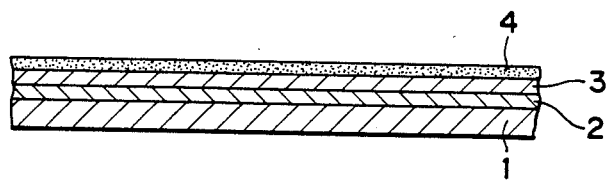
FIG. 3 is a sectional view showing the film type magnetic recording medium according to the present invention.

FIG. 3 is a sectional view showing the arrangement of the magnetic recording medium according to the present invention. In the drawing, designated at 1 is a film made of polyethylene terephthalate, 2 a primary-coating layer made of Al, 3 a ferromagnetic layer made of the Fe-Co-Ni-Cr alloy according to the present invention, and 4 a coated layer made of an organic substance.

As an alloy for deposition to be used in this example, an alloy containing 24 wt%Co, 12.3 wt%Ni, 6 wt%Cr, 1 wt%Mo, 0.2 wt%V, the balance essentially being Fe was vapor-deposited on a film of polyethylene terephthalate under a vacuum of $6 \sim 8 \times 10^{-6}$ Torr and at an angle of incidence 75°. The deposition speed was set at $100 \sim 150$ Å/min and the thickness of the film was 1000 Å.

The coercive force obtained then was 900 Oe, the saturated magnetic flux density was 7.0 KG, and an excellent performance was displayed as the high recording density medium.

In contrast thereto, when the alloy of Co—25 wt%Ni was deposited under the above-described conditions for example, the saturated magnetic flux density reaches only about 4.0 KG.

Subsequently, for the purpose of comparison, the Fe-Co-Ni-Cr alloy of the magnetic recording layer of the above composition according to the present invention and the Co—25 wt%Ni alloy were vapor-deposited on the plastic films, respectively, and thereafter, both the alloys are left to stand in an environment of temperature of 60° C. and humidity of 90 wt% for seven days. As a result, the Co-Ni alloy was corroded and changed in its color, whereas, there was no change in the Fe-Co-Ni-Cr alloy at all.

As has been described hereinabove, the magnetic recording layer according to the present invention can obviate the disadvantages in cost, durability, sensibility in the low-frequency area and the like, which have been problematical among the conventional metallic film type magnetic recording media, and hence, is an invention high in utility.

The present invention need not necessarily be limited to the above-described embodiments, and can be widely applied without departing from the technical scope described in the claims.

What is claimed is:

1. A film type magnetic recording medium comprising a base and a magnetic recording layer formed on said base, wherein said recording layer comprises an iron-cobalt-nickel-chromium magnetic alloy comprising from 10 to 51 wt% cobalt, from 1 to 30 wt% nickel, 10 wt% chromium or less, 6 wt% or less of at least one element selected from the group consisting of molybdenum, tungsten, vanadium, niobium, tantalum, copper, titanium and zirconium, the balance being iron and inevitable impurities.

2. The film type magnetic recording medium as in claim 1 wherein the alloy comprises 51 wt% cobalt or less and 20 wt% nickel or less within the hatched area in FIG. 1, and from 3 to 9 wt% chromium.

3. The film type magnetic recording medium as in claim 2 further comprising 3 wt% or less of at least one element selected from the group consisting of calcium, magnesium, aluminum, silicon and manganese.

4. The film type magnetic recording medium as in claim 3 further comprising 0.1 wt% or less of at least one element selected from the group consisting of gold, silver, one of platinum group elements, lanthanum and cerium, the balance being iron and inevitable impurities.

5. The film type magnetic recording medium as in claim 1, wherein said base comprises a film made of a plastic selected from the group consisting of polyethylene terephthalate, polycarbonate, and polypropylene and a primary-coating layer on said film.

6. A film type magnetic recording medium as in claim 2, wherein said base comprises a film made of a plastic selected from the group consisting of polyethylene terephthalate, polycarbonate, and polypropylene and a primary-coating layer on said film.

7. A film type magnetic recording medium as in claim 3, wherein said base comprises a film made of a plastic selected from the group consisting of polyethylene terephthalate, polycarbonate, and polypropylene and a primary-coating layer on said film.

8. A film type magnetic recording medium as in claim 4, wherein said base comprises a film made of a plastic selected from the group consisting of polyethylene terephthalate, polycarbonate, and polypropylene and a primary-coating layer on said film.

* * * * *